(12) United States Patent  
Luevano Gonzalez et al.

(10) Patent No.: US 10,189,391 B2
(45) Date of Patent: Jan. 29, 2019

(54) ADJUSTABLE LIE-FLAT SEAT (71) Applicant: Zodiac Seats US LLC, Gainesville, TX (US)

(72) Inventors: Patricia Luevano Gonzalez, Chih (MX); Oscar Ruiz Lara, Chih (MX)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 15/509,220

(22) PCT Filed: Sep. 17, 2015

(86) PCT No.: PCT/US2015/050567
§ 371 (c)(1),
(2) Date: Mar. 7, 2017

(87) PCT Pub. No.: WO2016/044517
PCT Pub. Date: Mar. 24, 2016

(65) Prior Publication Data
US 2017/0275001 A1 Sep. 28, 2017

Related U.S. Application Data

(60) Provisional application No. 62/052,077, filed on Sep. 18, 2014.

(51) Int. Cl.
*B60N 2/90* (2018.01)
*B64D 11/06* (2006.01)

(52) U.S. Cl.
CPC ............ *B60N 2/99* (2018.02); *B64D 11/0639* (2014.12); *B64D 11/0641* (2014.12)

(58) Field of Classification Search
CPC .......... B60N 2/66; B60N 2/665; B60N 2/667; B60N 2/643; B60N 2/646; B60N 2/99;
(Continued)

(56) References Cited

U.S. PATENT DOCUMENTS 3,330,598 A * 7/1967 Whiteside ................ A47C 4/54
297/284.3
4,555,140 A * 11/1985 Nemoto ............... B60N 2/4415
297/452.54
(Continued)

FOREIGN PATENT DOCUMENTS

EP          1630031       3/2006
WO       2012053022      4/2012

OTHER PUBLICATIONS

International Patent Application No. PCT/US2015/050567, Search Report and Written Opinion, dated Nov. 5, 2015.

*Primary Examiner* — Theodore V Adamos
(74) *Attorney, Agent, or Firm* — Kilpatrick Townsend & Stockton LLP; Dean W. Russell; Davidson G. Lucas (57) ABSTRACT

Described is a passenger seat that includes a seat bottom with a rear edge, the seat bottom including a bottom seating surface and a seat bottom adjustment mechanism where the seat bottom adjustment mechanism forms at least a portion of the bottom seating surface. The passenger seat also includes a seat back extending from the rear edge of the seat bottom, the seat back including a back seating surface and a seat back adjustment mechanism where the seat back adjustment mechanism forms at least a portion of the back seating surface. The adjustment mechanisms may each be configured to move between a deployed configuration and a retracted configuration. The seat bottom adjustment mechanism may be substantially flush with the bottom seating surface in the retracted configuration, and the seat back adjustment mechanism may be substantially flush with the back seating surface in the retracted configuration.

23 Claims, 4 Drawing Sheets

(58) Field of Classification Search
CPC .. B64D 11/06; B64D 11/0641; B64D 11/0639
USPC ......... 297/284.1, 284.3, 284.4, 284.6, 284.8, 297/284.7, 284.9
See application file for complete search history.

(56) References Cited

U.S. PATENT DOCUMENTS

| | | | | |
|---|---|---|---|---|
| 4,615,563 | A * | 10/1986 | Kobayashi | A47C 7/022 297/284.11 |
| 4,679,848 | A * | 7/1987 | Spierings | A47C 7/425 297/230.14 |
| 5,029,939 | A * | 7/1991 | Smith | A61G 7/05776 297/284.1 |
| 5,562,324 | A * | 10/1996 | Massara | A47C 7/467 297/284.6 |
| 6,199,252 | B1 * | 3/2001 | Masters | B60N 2/0224 29/91.1 |
| 6,679,557 | B2 * | 1/2004 | Craft | A47C 7/467 297/284.1 |
| 8,944,504 | B2 * | 2/2015 | Zimmerman, II | B60N 2/3013 297/284.6 |
| 2002/0121802 | A1 | 9/2002 | McMillen | |
| 2003/0173806 | A1 * | 9/2003 | McMillen | A47C 7/462 297/284.7 |
| 2005/0179306 | A1 * | 8/2005 | White | B60N 2/58 297/452.33 |
| 2008/0009989 | A1 * | 1/2008 | Kim | B60N 2/0232 701/36 |
| 2009/0284059 | A1 * | 11/2009 | Gupta | B60N 2/0224 297/284.9 |
| 2009/0289481 | A1 * | 11/2009 | Poniatowski | B60N 2/0232 297/284.9 |
| 2010/0145245 | A1 * | 6/2010 | Chen | A61H 9/0078 601/149 |
| 2010/0301640 | A1 * | 12/2010 | Heiser | A47C 1/06 297/135 |
| 2011/0266855 | A1 * | 11/2011 | Zimmerman, II | B60N 2/3013 297/378.1 |
| 2014/0117731 | A1 * | 5/2014 | Asli | B64D 11/06 297/284.9 |
| 2014/0159436 | A1 | 6/2014 | Iacobucci | |
| 2014/0319890 | A1 * | 10/2014 | Rivera | A47C 7/467 297/284.4 |

* cited by examiner

ADJUSTABLE LIE-FLAT SEAT

CROSS REFERENCE TO RELATED APPLICATIONS

This patent application is the U.S. national stage of PCT/US2015/050567 ("the '567 application"), filed on Sep. 17, 2015, which application is related to and claims priority benefit from U.S. Provisional Application No. 62/052,077 ("the '077 application"), filed on Sep. 18, 2014, entitled ContourZ—Adjustable Seat Frames. The '567 and '077 applications are hereby incorporated in its entirety their entireties by this reference.

FIELD OF THE INVENTION

The field of the invention relates ergonomic lie-flat passenger seats for aircraft or the like.

BACKGROUND

Many passenger seats such as those on passenger aircraft, buses, trains, and the like are intended to accommodate passengers in multiple positions or configurations. For example, some seat structural assemblies are designed for both sitting positions and lie-flat positions. However, because different seat surface contours are required for these positions, conventional seats require additional components such as additional and/or replaceable mattresses, contoured inserts, etc.

In certain situations, it may be desirable to design seats to adapt to sitting and lie-flat configurations without requiring replacement or additional components.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: a seat bottom with a rear edge, the seat bottom comprising a bottom seating surface and a seat bottom adjustment mechanism, the seat bottom adjustment mechanism comprising at least a portion of the bottom seating surface; and a seat back extending from the rear edge of the seat bottom, the seat back comprising a back seating surface and a seat back adjustment mechanism, the seat back adjustment mechanism comprising at least a portion of the back seating surface. The adjustment mechanisms may be configured to move between a deployed configuration and a retracted configuration, the seat bottom adjustment mechanism may be substantially flush with the bottom seating surface in the retracted configuration; and the seat back adjustment mechanism may be substantially flush with the back seating surface in the retracted configuration.

In some embodiments, each adjustment mechanism comprises at least one protrusion in the deployed configuration.

The passenger seat, in certain embodiments, further comprises a first cushion disposed adjacent to the bottom seating surface and a second cushion disposed adjacent to the back seating surface, wherein the bottom seating surface and the back seating surface each comprise rigid surfaces. In certain embodiments, the first and second cushions each comprise a constant thickness.

In some embodiments, the seat back adjustment mechanism comprises a plurality of moveable panels. In certain embodiments, each of the plurality of moveable panels is configured to translate and rotate.

The seat back adjustment mechanism, in certain embodiments, comprises at least one actuator configured to control movement of the plurality of moveable panels. In some embodiments, the at least one actuator comprises at least one of electric, mechanical, shape-memory alloy, magnetic shape-memory alloy, pneumatic, hydraulic, and piezoelectric.

In certain embodiments, the plurality of moveable panels comprises at least three moveable panels on a left side of the seat back and at least three moveable panels on a right side of the seat back.

The passenger seat, in certain embodiments, further comprises a central panel disposed between the at least three moveable panels on the left side of the seat back and the at least three moveable panels on the right side of the seat back. In some embodiments, the central panel comprises an elastic non-rigid material.

In some embodiments, the seat bottom adjustment mechanism comprises a plurality of moveable bottom panels. The plurality of moveable bottom panels, in certain embodiments, comprises at least two moveable panels on a left side of the seat bottom and at least two moveable panels on a right side of the seat bottom.

According to certain embodiments of the present invention, a passenger seat comprises: a seat bottom with a rear edge, the seat bottom comprising a rigid bottom seating surface and a plurality of moveable bottom panels, the plurality of moveable bottom panels comprising at least a portion of the rigid bottom seating surface; and a seat back extending from the rear edge of the seat bottom, the seat back comprising a rigid back seating surface and plurality of moveable back panels, the plurality of moveable back panels comprising at least a portion of the rigid back seating surface; wherein the plurality of moveable bottom panels are configured to move between a deployed configuration and a retracted configuration, the plurality of moveable bottom panels being substantially flat and flush with the rigid bottom seating surface in the retracted configuration; and wherein the plurality of moveable back panels are configured to move between a deployed configuration and a retracted configuration, the plurality of moveable back panels being substantially flat and flush with the rigid back seating surface in the retracted configuration.

In some embodiments, the plurality of moveable bottom panels comprise at least one protrusion in the deployed configuration; and the plurality of moveable back panels comprise at least one protrusion in the deployed configuration.

The passenger seat, in certain embodiments, further comprises a first cushion disposed adjacent to the rigid bottom seating surface and a second cushion disposed adjacent to the rigid back seating surface, wherein the first and second cushions each comprise a constant thickness.

In certain embodiments, each of the plurality of moveable bottom panels and each of the plurality of moveable back panels is configured to translate and rotate.

The passenger seat, in some embodiments, further comprises at least one actuator configured to control movement of the plurality of moveable bottom panels and at least one actuator configured to control movement of the plurality of moveable back panels.

In some embodiments, the plurality of moveable back panels comprises at least three moveable panels on a left side of the seat back and at least three moveable panels on a right side of the seat back.

The passenger seat, in certain embodiments, further comprises a central panel disposed between the at least three moveable panels on the left side of the seat back and the at least three moveable panels on the right side of the seat back.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
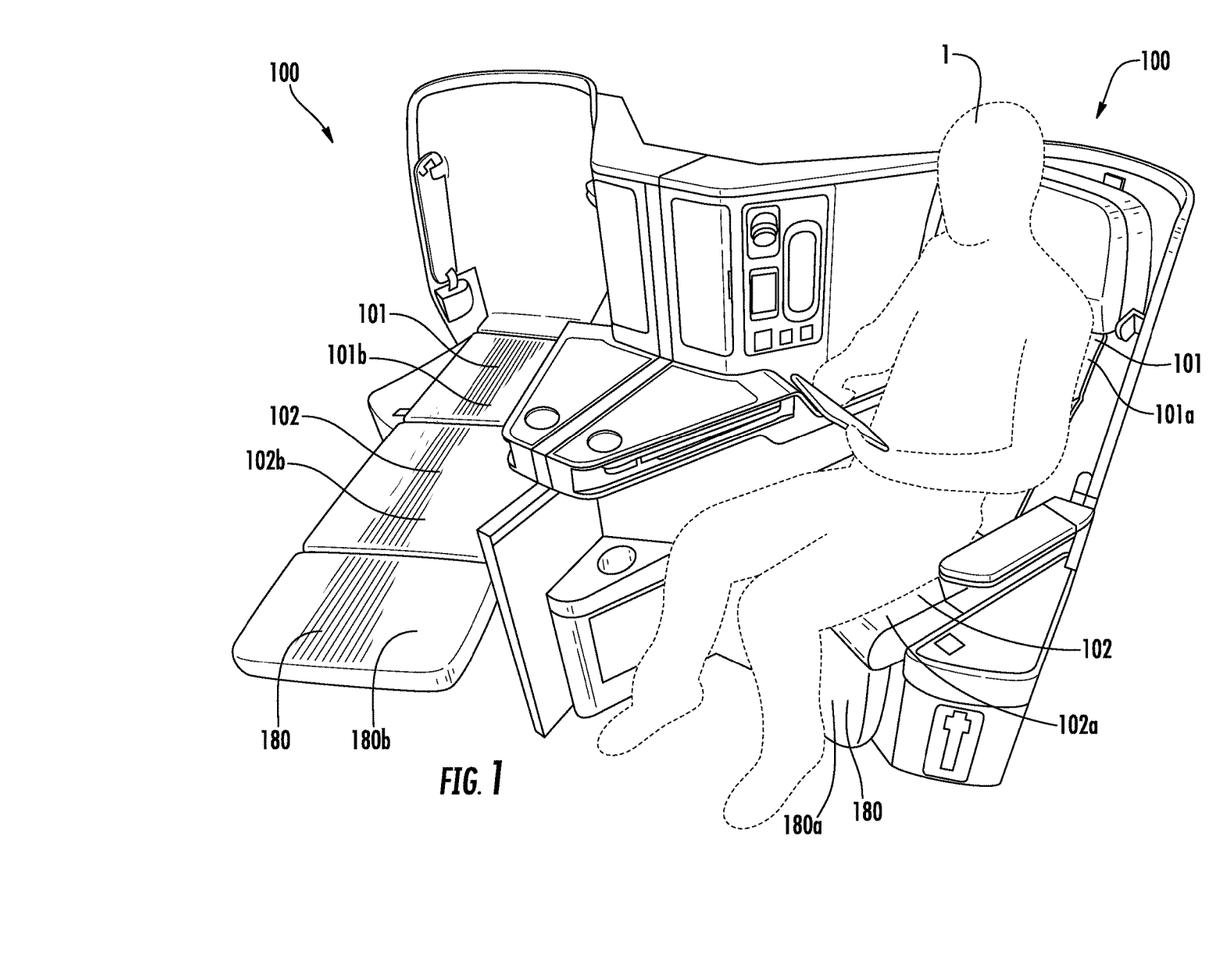
FIG. 1 is a perspective view of passenger seats according to certain embodiments of the present invention.

FIGS. 1-4 illustrate embodiments of passenger seats 100. In these embodiments, the passenger seat 100 may include a seat back 101 and a seat bottom 102. For example, as shown in FIG. 1, the seat 100 may include a seat back 101 and a seat bottom 102 such that the seat back 101 is attached to a rear edge of the seat bottom 102. The seat back 101 may be configured to move between a sitting configuration 101a and a lie-flat configuration 101b. Similarly, the seat bottom 102 may be configured to move between a sitting configuration 102a and a lie-flat configuration 102b. The seat back 101 may include a back seating surface under a cushion 201 and the seat bottom 102 may include a bottom seating surface under a cushion 202. In some embodiments, the seat 100 may include a leg support portion 180 configured to move between a sitting configuration 180a and a lie-flat configuration 180b. FIGS. 2A and 2B illustrate additional views of the sitting and lie-flat configurations, respectively.

Figure 2A:
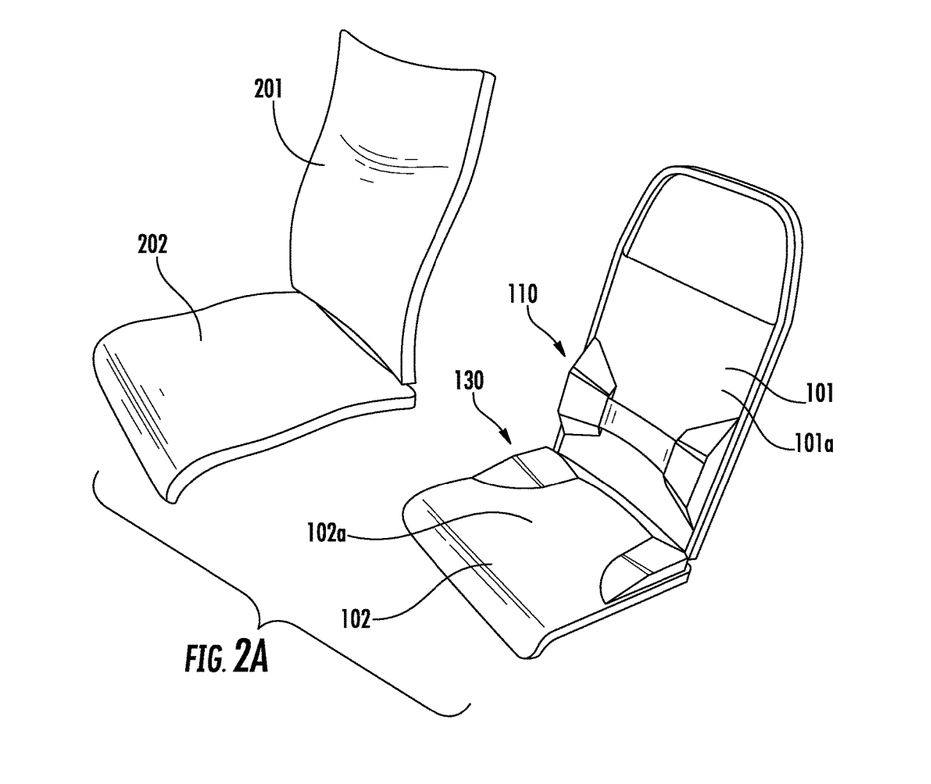
FIGS. 2A and 2B are perspective view of the passenger seats of FIG. 1.
Figure 3:
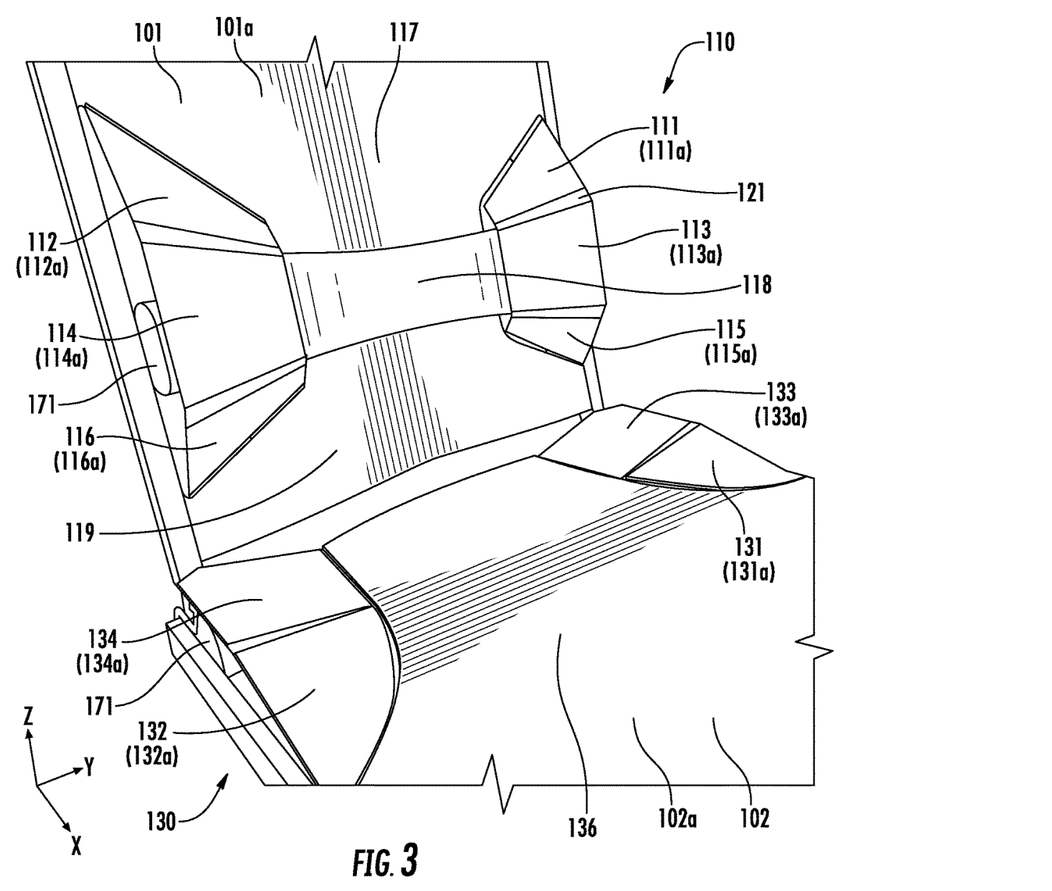
FIG. 3 is a detail perspective view of the passenger seat of FIG. 1.

As shown in FIG. 2A, the seat back 101 may include a seat back adjustment mechanism 110 and seat bottom 102 may include a seat bottom adjustment mechanism 130. In some embodiments, the adjustment mechanisms 110 and 130 are configured to change the surface contour of the surface of seat back 101 and seat bottom 102 underneath the cushions 201 and 202 between a deployed configuration and a retracted configuration. For the seat back 101, the seat back adjustment mechanism 110 may form part or all of the back seating surface (which may be rigid in certain embodiments) under the cushion 201 such that the rigid surface may include significant contour in a deployed configuration (see FIG. 3) and, based on movement of the seat back adjustment mechanism 110, the rigid surface may be approximately or entirely flat in a retracted configuration such that seat back adjustment mechanism 110 is at least substantially (and may be entirely) flush with the back seating surface (see FIG. 4). For example, as shown in FIG. 3, when the seat back adjustment mechanism 110 is in the deployed configuration, the back seating surface may include one or more protrusions configured to create a contoured surface to interface with a lumbar region of a passenger 1's back. Similarly, for the seat bottom 102, the seat bottom adjustment mechanism 130 may form part or all of the bottom seating surface (which may be rigid in certain embodiments) under the cushion 202 such that the rigid surface may include significant contour in a deployed configuration (see FIG. 3) and, based on movement of the seat back adjustment mechanism 130, the rigid surface may be approximately or entirely flat in a retracted configuration such that seat bottom adjustment mechanism 130 is at least substantially (and may be entirely) flush with the bottom seating surface (see FIG. 4). For example, as shown in FIG. 3, in the deployed configuration, the bottom seating surface may include one or more protrusions configured to create a contoured surface to interface with a tailbone region of a passenger 1.

The adjustment mechanisms 110 and 130 may each include one or more actuators 171 for controlling a plurality of moveable panels (i.e., between deployed and retracted configurations). The actuators 171 may be electric (e.g., solenoid based, motor based, etc.), mechanical, shape-memory alloy (SMA), magnetic shape-memory alloy (MSMA), pneumatic, hydraulic, piezoelectric, or any other appropriate actuator. In addition, because the seat back adjustment mechanism 110 and the seat bottom adjustment mechanism 130 are configured to modify the shape and/or contour of the rigid surfaces of the seat 100, the seat back cushion 201 and the seat bottom cushion 202 may be simple constant-thickness cushions that are compatible with both deployed configurations and retracted configurations.

Figure 2B:
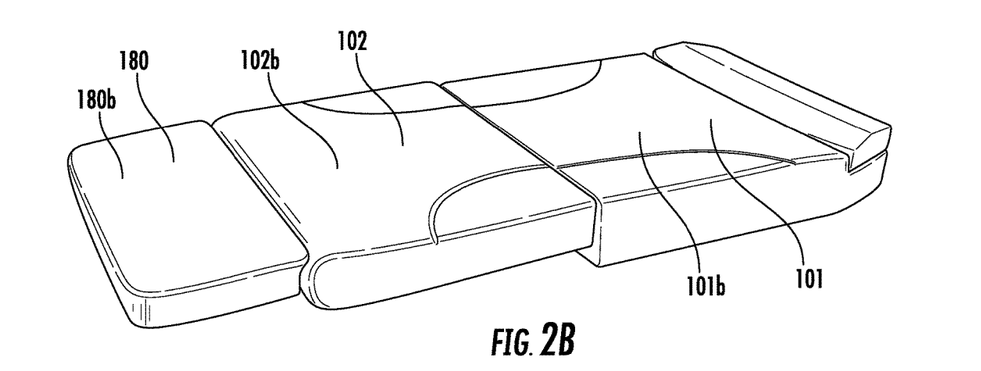

In addition to actuators 171 for controlling one or more of the moveable panels of the seat back adjustment mechanism 110 and the seat bottom adjustment mechanism 130, the passenger seat 100 may include one or more actuators for moving the seat back 101, the seat bottom 102, the leg support portion 180, and/or any other portion of seat 100. For example, as shown in FIGS. 2A and 2B, the seat back 101 may pivot with respect to the seat bottom 102 when moving between the sitting configuration (FIG. 2A) and the lie-flat configuration (FIG. 2B). In addition to moving components of the passenger seat 100 between the sitting configuration and the lie-flat configuration, the actuators associated with the components of the seat 100 may be configured to adjust incrementally such that a passenger 1 may selectively adjust one or more of the components of the seat 100 based on preferences and comfort. For example, a passenger 1 may pivot the seat back 101 relative to the seat bottom 102 to recline the seat 100 without adjusting the seat to a lie-flat configuration (i.e., where the seating surfaces of the seat back 101 and the seat bottom 102 are approximately parallel with one another and are substantially horizontal during flight).

Figure 4:
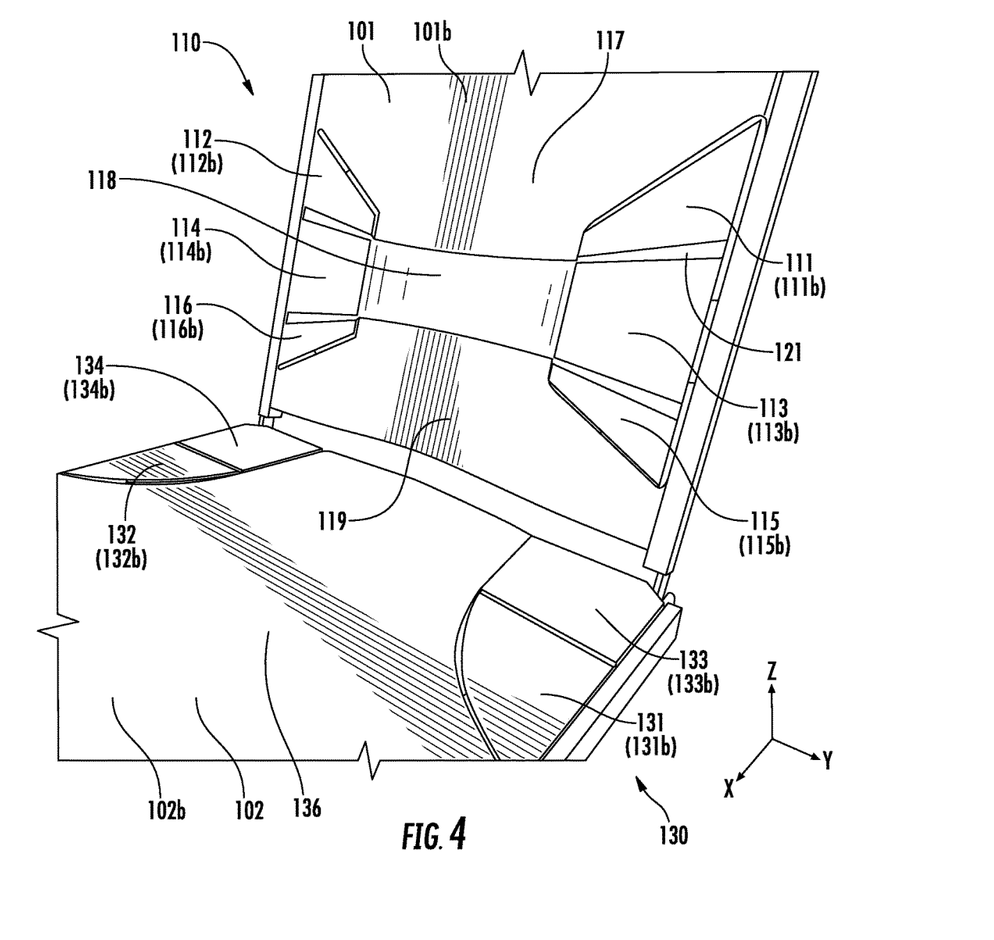
FIG. 4 is a detail perspective view of the passenger seat of FIG. 1.

FIG. 3 shows the seat back adjustment mechanism 110 and the seat bottom adjustment mechanism 130 in the deployed configuration and FIG. 4 shows the seat back adjustment mechanism 110 and the seat bottom adjustment mechanism 130 in the refracted configuration (before the seat back 101 is pivoted to be approximately parallel with the seat bottom 102, see FIG. 2B). Although FIGS. 2A, 3, and 4 illustrate seat back adjustment mechanism 110 with moveable panels configured to adjust the contour/shape of the seat 100's lumbar area, the seat back adjustment mechanism 110 is not limited thereto. The seat back adjustment mechanism 110 may include moveable panels for adjusting the contour of the middle back and shoulder areas or any other portion of the seat back 101. Similarly, although FIGS. 2A, 3, and 4 illustrate seat bottom adjustment mechanism 130 with moveable panels configured to adjust the contour/shape of the rear outer portion of seat bottom 102, the seat bottom adjustment mechanism 130 is not limited thereto. The seat bottom adjustment mechanism 130 may include moveable panels for adjusting the contour of the middle and front areas or any other portion of the seat bottom 102.

In some embodiments, the seat back adjustment mechanism 110 has three moveable panels on the left side of the seat including upper left moveable panel 111, center left moveable panel 113, and lower left moveable panel 115. The seat back adjustment mechanism 110 may also have three moveable panels on the right side of the seat including upper right moveable panel 112, center right moveable panel 114, and lower right moveable panel 116. Located centrally with respect to the seat back adjustment mechanism 110 is the central panel 118, which, in certain embodiments, spans between the center left moveable panel 113 and the center right moveable panel 114. The central panel 118 may be configured to move based on actuator movement (similar to panels 111-116), may be configured to move passively based on the movement of panels 111-116, may be static, or may be a combination thereof. The central panel 118 may comprise an elastic non-rigid material or may be a rigid material. In some embodiments, the central panel 118 is connected to one or more of the panels 111-116 using elastic components and/or the panels 111-116 are connected to one another with elastic components or elastic straps 121. The seat back 101 may also include an upper portion 117 and a lower portion 119. Similar to central panel 118, the upper portion 117 and the lower portion 119 may be connected to one or more of the panels 111-116 using elastic components. In some embodiments, the seat 100 may include one or more protrusions configured to interface with the lumbar region of a passenger 1's back. The central panel 118 may protrude from the back seating surface to interface with the passenger 1's spine. In addition, the moveable panels 111-116 may protrude from the back seating surface. In particular, the center left moveable panel 113 and the center right moveable panel 114 may protrude more than any other panels. In some embodiments, the center left moveable panel 113 and the center right moveable panel 114 protrude and are rotated such that their outer edges protrude away from the back seating surface. As shown in FIG. 3, in the deployed configuration, the seat back adjustment mechanism 110 forms a cradle shape with larger protrusions at the sides of the seat 100.

In certain embodiments, the moveable panels 111-116 are four-sided and may be trapezoidal shaped where the outer edge is parallel or approximately parallel to the inner edge for each moveable panel.

The moveable panels 111-116 may be configured to translate and/or rotate in various directions. For example, the moveable panels 111-116 may each have six degrees of freedom such that each panel may move along up to three perpendicular axes (including simultaneous movement along two or three axes) (i.e., translation) and may rotate about three perpendicular axes (including simultaneous rotation about two or three axes). In some embodiments, the moveable panels 111-116 are each configured to have two predetermined configurations that correspond to deployed configurations (FIG. 3) and retracted configurations (FIG. 4). As shown in FIGS. 3 and 4, the center left moveable panel 113 moves from a deployed configuration 113a to a retracted configuration 113b. In some embodiments, to move between these two positions, the center left moveable panel 113 translates primarily along the X-direction (this movement may also include some translation along the Y and/or Z directions) and rotates primarily about the Z-axis (this movement may also include some rotation about the X and/or Y axes). The center right moveable panel 114 moves in a similar manner to the center left moveable panel 113 such that, in some embodiments, the two panels 113 and 114 rotate in opposite directions of one another about the same axis (or axes). In certain embodiments, the moveable panels 113 and 114 primarily rotate with little or no translation.

To move between a deployed configuration (111a) and a retracted configuration (111b), the upper left moveable panel 111 may translate along the X direction (this movement may also include some translation along the Y and/or Z directions) and rotates primarily about the Y and Z axes (this movement may also include some rotation about the X axis). The upper right moveable panel 112 moves in a similar manner to the upper left moveable panel 111 such that, in some embodiments, the two panels 111 and 112 rotate in opposite directions of one another about the same axis (or axes). In certain embodiments, the moveable panels 111 and 112 primarily rotate with little or no translation.

To move between a deployed configuration (115a) and a retracted configuration (115b), the lower left moveable panel 115 may translate along the X direction (this movement may also include some translation along the Y and/or Z directions) and rotates primarily about the Y and Z axes (this movement may also include some rotation about the X axis). The lower right moveable panel 116 moves in a similar manner to the lower left moveable panel 115 such that, in some embodiments, the two panels 115 and 116 rotate in opposite directions of one another about the same axis (or axes). In certain embodiments, the moveable panels 115 and 116 primarily rotate with little or no translation.

In some embodiments, the seat bottom adjustment mechanism 130 has two moveable panels on the left side of the seat including forward left moveable panel 131 and rear left moveable panel 133. The seat bottom adjustment mechanism 130 may also have two moveable panels on the right side of the seat including forward right moveable panel 132 and rear right moveable panel 134. Located centrally with respect to the seat bottom adjustment mechanism 130 is the middle portion 136. The middle portion 136 may be configured to move based on actuator movement (similar to panels 131-134), may be configured to move passively based on the movement of panels 131-134, may be static, or may be a combination thereof. The middle portion 136 may comprise an elastic material or may be a rigid material. In some embodiments, the middle portion 136 is connected to one or more of the panels 131-134 using elastic components.

As shown in FIGS. 3 and 4, the forward left moveable panel 131 and the forward right moveable panel 132 may be three-sided and include a curved or round edge. The rear left moveable panel 133 and the rear right moveable panel 134 may be four-sided.

The moveable panels 131-134 may be configured to move (translate) and/or rotate in various directions. For example, the moveable panels 131-134 may each have six degrees of freedom such that each panel may move along up to three perpendicular axes (including simultaneous movement along two or three axes) (i.e., translation) and may rotate about three perpendicular axes (including simultaneous rotation about two or three axes). In some embodiments, the moveable panels 131-134 are each configured to have two predetermined configurations that correspond to deployed configurations (FIG. 3) and the retracted configurations (FIG. 4).

As shown in FIGS. 3 and 4, to move between a deployed configuration (131a) and a retracted configuration (131b), the forward left moveable panel 131 may translate along the Z direction (this movement may also include some translation along the X and/or Y directions) and rotates primarily about the X and Y axes (this movement may also include some rotation about the Z axis). The forward right moveable panel 132 moves in a similar manner to the forward left moveable panel 131 such that, in some embodiments, the two panels 131 and 132 rotate in opposite directions of one another about the same axis (or axes). In certain embodiments, the moveable panels 131 and 132 primarily rotate with little or no translation.

To move between a deployed configuration (133a) and a retracted configuration (133b), the rear left moveable panel 133 may translate along the Z direction (this movement may also include some translation along the X and/or Y directions) and rotates primarily about the X and Y axes (this movement may also include some rotation about the Z axis). The rear right moveable panel 134 moves in a similar manner to the rear left moveable panel 133 such that, in some embodiments, the two panels 133 and 134 rotate in opposite directions of one another about the same axis (or axes). In certain embodiments, the moveable panels 133 and 134 primarily rotate with little or no translation.

In some embodiments, the moveable panels 111-116 and 131-134 are configured to move between their respective deployed and retracted configurations. In certain embodiments, a passenger 1 may selectively adjust one or more of the moveable panels 111-116 and 131-134 based on preferences and comfort. In other words, the actuator(s) for controlling the moveable panels 111-116 and 131-134, in addition to moving the panels between deployed and retracted configurations, the actuators are configured to adjust the position of one or more of the panels based on input from passenger 1. For example, FIG. 3 shows one example of the moveable panels 111-116 and 131-134 disposed in deployed positions; however, based on an individual passenger 1's anatomy or comfort, it may be necessary to adjust the position of one or more moveable panels. Similarly, when the seat 100 is in the lie-flat configuration (see FIG. 2B), a passenger 1 may wish to adjust the position of one or more of the moveable panels 111-116 and 131-134.

The components of the seat 100 may be formed of materials including, but not limited to, carbon composite, plastic, thermoplastic, steel, aluminum, stainless steel, other plastic or polymer materials, other metallic materials, other composite materials, or other similar materials. Moreover, the components of the seat 100 may be attached to one another via suitable fasteners, which include, but are not limited to, screws, bolts, rivets or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
   a seat back comprising at least one seat back actuator, a rigid back seating surface, and a plurality of moveable back panels, the plurality of moveable back panels comprising at least a portion of the rigid back seating surface, wherein:
   the at least one seat back actuator is disposed behind the rigid back seating surface and immediately adjacent to a rear side of at least one of the moveable back panels;
   the plurality of moveable back panels are configured to move between a deployed configuration and a retracted configuration due to movement of the at least one seat back actuator, the plurality of moveable back panels being substantially flat and flush with the rigid back seating surface in the retracted configuration; and
   at least two edges of each of the plurality of moveable back panels are attached to adjacent portions of the rigid back seating surface.

2. The passenger seat of claim 1, further comprising a seat bottom extending from a lower edge of the seat back, the seat bottom comprising at least one seat bottom actuator, a bottom seating surface, and plurality of moveable bottom panels, the plurality of moveable bottom panels comprising at least a portion of the bottom seating surface, wherein:
   the at least one seat bottom actuator is disposed behind the bottom seating surface and immediately adjacent to a rear side of at least one of the moveable bottom panels; and
   the plurality of moveable bottom panels are configured to move between a deployed configuration and a retracted configuration due to movement of the at least one seat bottom actuator, the plurality of moveable bottom panels being substantially flat and flush with the bottom seating surface in the retracted configuration.

3. A passenger seat comprising:
   a seat bottom with a rear edge, the seat bottom comprising at least one seat bottom actuator, a bottom seating surface, and a plurality of moveable bottom panels, wherein the plurality of moveable bottom panels comprise at least a portion of the bottom seating surface; and
   a seat back extending from the rear edge of the seat bottom, the seat back comprising at least one seat back actuator, a back seating surface, and a plurality of moveable back panels, wherein the plurality of moveable back panels comprise at least a portion of the back seating surface, wherein:
   each of the plurality of moveable bottom panels is configured to move between a deployed configuration and a retracted configuration due to movement of the at least one seat bottom actuator;
   each of the plurality of moveable back panels is configured to move between a deployed configuration and a retracted configuration due to movement of the at least one seat back actuator;

at least two edges of each of the plurality of moveable back panels are attached to adjacent portions of the back seating surface;

the at least one seat bottom actuator is disposed under the bottom seating surface and immediately adjacent to a rear side of at least one of the moveable bottom panels;

the at least one seat back actuator is disposed behind the back seating surface and immediately adjacent to a rear side of at least one of the moveable back panels;

each of the plurality of moveable bottom panels is substantially flush with the bottom seating surface in the retracted configuration; and each of the plurality of moveable back panels is substantially flush with the back seating surface in the retracted configuration.

4. The passenger seat of claim 3, wherein each of the plurality of moveable panels comprises a rigid panel and is configured to form at least one protrusion in the deployed configuration.

5. The passenger seat of claim 3, further comprising a first cushion disposed adjacent to the bottom seating surface and a second cushion disposed adjacent to the back seating surface, wherein the bottom seating surface and the back seating surface each comprise rigid surfaces.

6. The passenger seat of claim 5, wherein the first and second cushions each comprise a constant thickness.

7. The passenger seat of claim 3, wherein each of the plurality of moveable panels is configured to translate and rotate.

8. The passenger seat of claim 3, wherein the at least one seat back actuator and the at least one seat bottom actuator each comprise one of electric, mechanical, shape-memory alloy, magnetic shape-memory alloy, pneumatic, hydraulic, and piezoelectric.

9. The passenger seat of claim 3, wherein the plurality of moveable back panels comprises at least three moveable panels on a left side of the seat back and at least three moveable panels on a right side of the seat back.

10. The passenger seat of claim 9, further comprising a central panel disposed between the at least three moveable panels on the left side of the seat back and the at least three moveable panels on the right side of the seat back.

11. The passenger seat of claim 10, wherein the central panel comprises an elastic non-rigid material.

12. The passenger seat of claim 3, wherein the plurality of moveable bottom panels comprises at least two moveable panels on a left side of the seat bottom and at least two moveable panels on a right side of the seat bottom.

13. The passenger seat of claim 3, wherein at least one of the plurality of moveable back panels comprises three edges attached to adjacent portions of the back seating surface.

14. The passenger seat of claim 3, further comprising at least one elastic strap extending between adjacent moveable back panels.

15. The passenger seat of claim 3, wherein at least two edges of each of the plurality of moveable bottom panels are attached to adjacent portions of the bottom seating surface.

16. A passenger seat comprising:
a seat back comprising at least one seat back actuator, a rigid back seating surface, and a plurality of moveable back panels, the plurality of moveable back panels comprising at least a portion of the rigid back seating surface; and
a seat bottom extending from a lower edge of the seat back, the seat bottom comprising at least one seat bottom actuator, a rigid bottom seating surface, and plurality of moveable bottom panels, the plurality of moveable bottom panels comprising at least a portion of the rigid bottom seating surface, wherein:

the at least one seat back actuator is disposed behind the rigid back seating surface and immediately adjacent to a rear side of at least one of the moveable back panels;

the plurality of moveable back panels are configured to move between a deployed configuration and a retracted configuration due to movement of the at least one seat back actuator, the plurality of moveable back panels being substantially flat and flush with the rigid back seating surface in the retracted configuration;

the at least one seat bottom actuator is disposed behind the rigid bottom seating surface and immediately adjacent to a rear side of at least one of the moveable bottom panels;

the plurality of moveable bottom panels are configured to move between a deployed configuration and a retracted configuration due to movement of the at least one seat bottom actuator, the plurality of moveable bottom panels being substantially flat and flush with the rigid bottom seating surface in the retracted configuration; and at least two edges of each of the plurality of moveable bottom panels are attached to adjacent portions of the rigid bottom seating surface.

17. The passenger seat of claim 16, wherein:
the plurality of moveable back panels each comprise a rigid panel and is configured to form at least one protrusion in the deployed configuration.

18. The passenger seat of claim 16, further comprising a first cushion disposed adjacent to the rigid back seating surface, wherein the first cushion comprises a constant thickness.

19. The passenger seat of claim 16, wherein each of the plurality of moveable back panels is configured to translate and rotate.

20. The passenger seat of claim 16, wherein the plurality of moveable back panels comprises at least three moveable panels on a left side of the seat back and at least three moveable panels on a right side of the seat back.

21. The passenger seat of claim 20, further comprising a central panel disposed between the at least three moveable panels on the left side of the seat back and the at least three moveable panels on the right side of the seat back.

22. The passenger seat of claim 16, wherein at least two edges of each of the plurality of moveable back panels are attached to adjacent portions of the rigid back seating surface.

23. A passenger seat comprising:
a seat bottom with a rear edge, the seat bottom comprising at least one seat bottom actuator, a bottom seating surface, and a plurality of moveable bottom panels, wherein the plurality of moveable bottom panels comprise at least a portion of the bottom seating surface; and
a seat back extending from the rear edge of the seat bottom, the seat back comprising at least one seat back actuator, a back seating surface, and a plurality of moveable back panels, wherein the plurality of moveable back panels comprise at least a portion of the back seating surface, wherein:

each of the plurality of moveable bottom panels is configured to move between a deployed configuration and a retracted configuration due to movement of the at least one seat bottom actuator;

each of the plurality of moveable back panels is configured to move between a deployed configuration and a retracted configuration due to movement of the at least one seat back actuator;

at least one of the plurality of moveable back panels comprises three edges attached to adjacent portions of the back seating surface;

the at least one seat bottom actuator is disposed under the bottom seating surface and immediately adjacent to a rear side of at least one of the moveable bottom panels;

the at least one seat back actuator is disposed behind the back seating surface and immediately adjacent to a rear side of at least one of the moveable back panels;

each of the plurality of moveable bottom panels is substantially flush with the bottom seating surface in the retracted configuration; and each of the plurality of moveable back panels is substantially flush with the back seating surface in the retracted configuration.

* * * * *